July 6, 1937.   A. B. WINCHELL   2,086,251
WINDSHIELD CLEANER MOTOR
Filed May 12, 1934   2 Sheets-Sheet 1
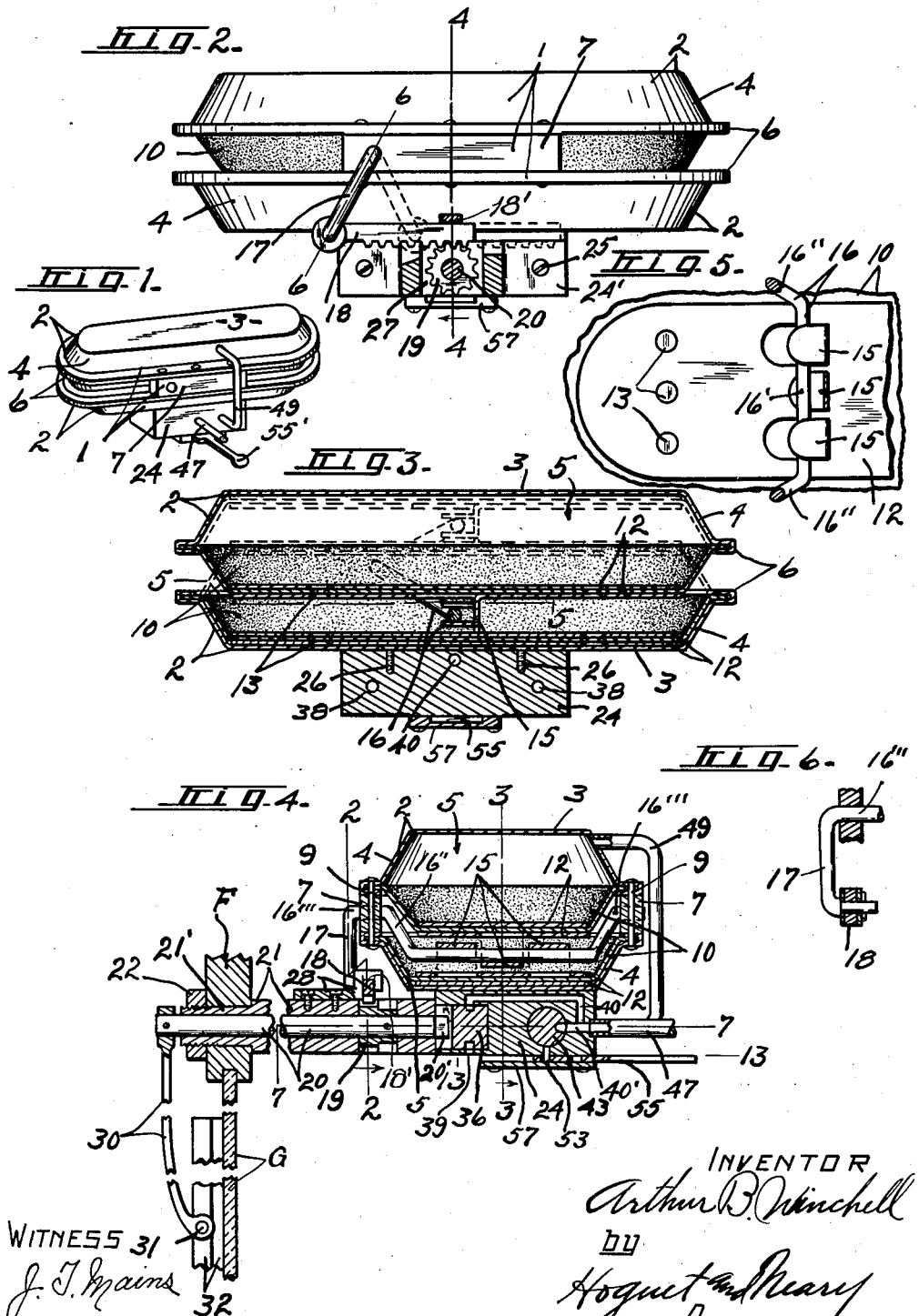

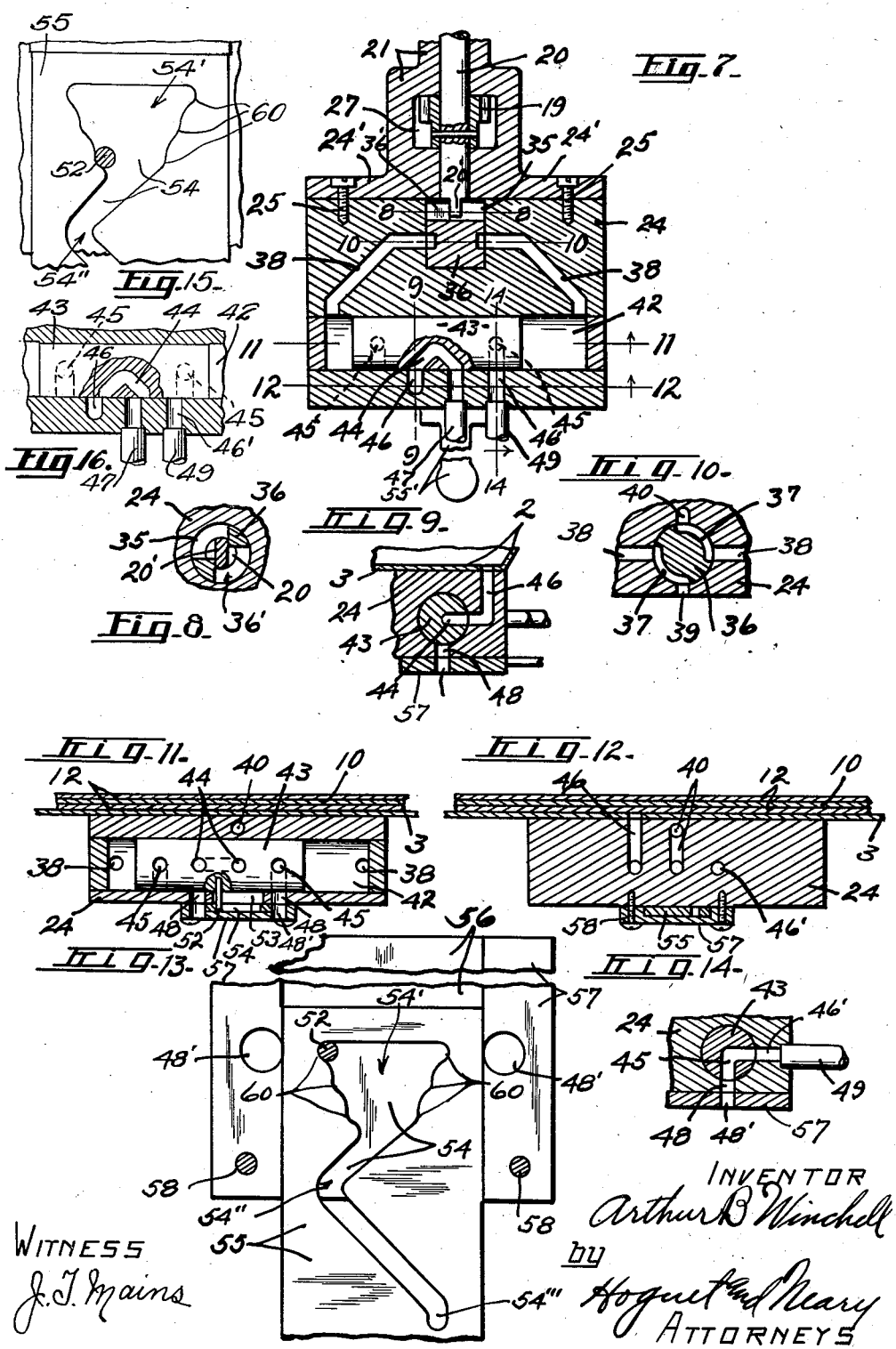

Patented July 6, 1937

2,086,251

UNITED STATES PATENT OFFICE 2,086,251

WINDSHIELD CLEANER MOTOR

Arthur B. Winchell, Jackson, Mich., assignor to The Sparks-Withington Company, Jackson, Mich., a corporation of Ohio Application May 12, 1934, Serial No. 725,323

14 Claims. (Cl. 121—48)

This invention relates to a windshield cleaner of the fluid pressure type comprising a wiper arm assembly having a cleaner element adapted to be moved across a windshield glass in wiping engagement therewith to clean the same, a small fluid pressure motor adapted to be operated by differential pressure produced by utilizing the suction created in the intake manifold of the engine for operating the vehicle or other suitable vacuum producing means, and a simply constructed automatic valve mechanism for controlling the action of the vacuum in the cleaner motor.

The primary objects of this invention are to produce a windshield cleaner motor of the above-mentioned type which is simple, economical and durable in construction, and which is strong, positive and efficient in operation.

A more specific object of the invention resides in providing a novelly constructed motor adapted to be operated by differential fluid pressure, wherein the leakage of the operating fluid in the pressure chambers is substantially entirely eliminated, thereby producing a pressure-operated motor which is particularly adapted for long continuous service.

Another object of the invention is to provide a fluid-pressure-operated motor of the above-mentioned type having a minimum amount of exposed moving parts.

A further object of the invention is to provide an automatic valve mechanism for a suction-operated motor adapted to control the action of the suction or partial vacuum in the motor which is simple in construction and operation.

A still further object is to provide a vacuum-operated motor for a windshield cleaner having a novel control means associated with the automatic valve mechanism for governing the speed of the motor.

Other objects and advantages pertaining to the construction of the device, and to the form and relation of the parts thereof will more fully appear from the following description taken in connection with the accompanying drawings, in which:—

Figure 1 is a perspective of a windshield cleaner motor embodying the various features of this invention.

Figure 2 is a longitudinal sectional view taken substantially on line 2—2, Figure 4, looking in the direction indicated by the arrow.

Figure 3 is a longitudinal sectional view taken on line 3—3, Figure 4.

Figure 4 is a transverse sectional view taken in the plane of the line 4—4, Figure 2, and illustrating my novel windshield cleaner operatively connected with a windshield structure.

Figure 5 is a detail horizontal sectional view taken substantially on line 5—5, Figure 3.

Figure 6 is a fragmentary sectional view taken in the plane of line 6—6, Figure 2.

Figure 7 is an enlarged detail horizontal sectional view through the automatic control valve mechanism taken on line 7—7, Figure 4.

Figures 8, 9, 10, 11, and 12 are detail vertical sectional views taken respectively on lines 8—8, 9—9, 10—10, 11—11 and 12—12, Figure 7.

Figure 13 is an enlarged horizontal sectional view taken on line 13—13, Figure 4, with certain portions thereof broken away and illustrating the inner end of the control plate in plan view.

Figure 14 is a detail vertical sectional view taken on line 14—14, Figure 7.

Figure 15 is a fragmentary view similar to Figure 13 illustrating the control plate in an intermediate position for effecting the operation of the motor at a reduced speed. Figure 16 is a fragmentary sectional view of the valve block similar to Figure 7 illustrating the main control valve in an intermediate position as determined by the control plate when in the position illustrated in Figure 15.

As illustrated in the drawings, my improved windshield cleaner comprises a composite diaphragm support 1 composed of two complemental recessed sections 2 formed, in this instance, of sheet metal stampings. Each of the sections 2 is oblong in plan view and comprises a bottom wall 3, and outwardly flaring or tapered side walls 4, which define an oblong recess or chamber 5. The outer marginal portion of the side wall 4 of each section terminates in a reverse bent flange portion 6, which extends outwardly from the side walls 4 in substantially parallel relation with the bottom wall 3.

The sections 2 are arranged in opposed relation with the recesses 5 facing each other, and are secured together in transverse spaced relation by means of a pair of spacing blocks 7 arranged one on either side of the sections 2 intermediate the ends thereof and bolts or rivets 9 passing through alined openings provided in the flanges 6 and blocks 7. Each section 2 is provided with a diaphragm 10 which extends across the recess thereof, and is composed of fabric or other suitable material treated by rubber or the like to render the same impervious to air and moisture.

Each diaphragm 10 is secured at the marginal edge thereof to a respective section 2 in any suitable manner to form a fluid-tight connection as by bending or crimping the flange 6 of the section over the adjacent portion of the diaphragm, as clearly illustrated in Figure 3. Each of the diaphragms 10 is provided with a pair of re-inforcing plates 12 positioned, one at either side of the central portion of the diaphragm. These plates 12 are oblong in plan view; that is, they conform in general outline and area to the inner surface of the bottom walls 3 of the sections 2 so that when the diaphragms are in their innermost positions, the plate positioned at the inside of the diaphragm will lie in close proximity to the bottom wall and thereby provide each diaphragm with a maximum effective pressure surface.

The plates 12 of each diaphragm are secured together and to the diaphragm by any suitable means such as rivets 13. It will be noted, by referring to Figures 3 and 4, that the diaphragms are mounted at adjacent sides of the frame 2 in complemental relation with their outer or adjacent surfaces constantly exposed to atmospheric pressure. In order that the diaphragms may be secured together for transmitting motion from one to the other, the re-inforcing plates 12 positioned at their outer or adjacent surfaces are provided with ears 15 formed by stamping a portion of the plate outwardly. The ears of the plates are arranged in alternate relation with the outer portion of the ears of one plate extended beyond similar portions of the ears of the other plate so as to provide a recess therebetween open at one side for receiving the transverse portion 16' of a substantially U-shaped rock or crankshaft 16.

The transverse portion 16' of the rock shaft is adapted to extend transversely of the plates 12, while the side members at 16'' of the shaft extend outwardly from the transverse portion 16' at an angle thereto and have the outer ends thereof bent to extend outwardly in coaxial relation, and substantially parallel with the transverse portion 16' to form bearing members 16''' which are journaled in suitable openings provided in the spacing blocks 7.

One of the portions 16''' of the rock shaft 16 is extended outwardly beyond the adjacent block member 7 and is provided with a crank arm 17 which may be secured thereto or made integral therewith.

This crank arm 17 has pivotally mounted on the outer or free end thereof, a rack member 18 which is in meshing engagement with a pinion 19 secured to the wiper shaft 20. The wiper shaft, in this instance, is journaled in a supporting sleeve 21 which has one end thereof provided with a reduced threaded portion 21' adapted to extend through a suitable aperture provided in the windshield frame as F.

The sleeve 21 is clamped to the frame F, in this instance, by means of a nut 22 screw-threaded on the outer end of the sleeve to clamp the frame F therebetween and the shoulder provided at the inner end of the reduced portion 21'. The sleeve 21 is secured at its other end to a valve block 24, and for this purpose, the inner end of the sleeve is provided with outwardly flanged portions 24' having apertures for the reception of screws 25 which are screw-threaded in the adjacent portion of the block 24 as illustrated in Figure 7.

The valve block 24 is secured to the bottom of the lowermost section 2 as by screws 26. The pinion 19 is mounted on the shaft 20 in a recess 27 provided in the sleeve 21 near the inner end of said sleeve.

The rack 18 is maintained by a retaining bracket 28 which is secured to the upper portion of the sleeve 21 adjacent the recess 27 with the inner end thereof extending over the rack 18 and provided with a groove 18' in the inner face thereof adapted to slidably receive the rack 18 therein.

The outer end of the wiper shaft 20 extends beyond the sleeve 21 and has operably secured thereto a suitable wiper arm assembly which, as shown in Figure 4, comprises a wiper arm 30 secured in any suitable manner at one end to the shaft 20, and has the other end thereof connected as by the pivot 31 to a wiper blade 32. The wiper blade 32 is adapted to engage the windshield glass as G, mounted in the frame F. The wiper blade 32 may be yieldingly urged towards the glass G by any suitable means, and for this reason the arm 30 may as shown be a spring member having the outer or free end thereof spring-tensioned in the direction of the glass.

The inner end of the wiper shaft 20 terminates in an auxiliary valve chamber 35 provided in the valve block 24 adjacent the inner end of the sleeve 21 in coaxial relation with the shaft 20.

An auxiliary control valve 36 is journaled in the chamber 35. This valve is, in this instance, a cylindrical member having fluid passages or ducts 37 provided in the periphery at diametrically opposite sides thereof adapted to alternately connect fluid passages 38 provided in the valve block 24, and which communicate at one end with the valve chamber 35 at diametrically opposite sides thereof with an exhaust port 39 provided in the lower wall of the chamber 35, and with a suction passage 40 provided in the valve block 24, and which communicates with the valve chamber 35 diametrically opposite the exhaust port 39.

The valve 36 is intermittently rocked in the valve chamber 35 by means of the wiper shaft 20, and for this purpose, the inner end of the wiper shaft is provided with a reduced tongue portion 20' adapted to extend into a diametrically disposed slot 36' provided in the outer or adjacent end of the valve 36. The relation of the tongue 20' and slot 36' is such that when the shaft 20 approaches the limit of its rocking movement in either direction, said tongue 20' will engage the side walls of the recess 36' and rotate the valve 36 sufficiently to cut-off communication through the ducts 37 of one of the passages 38 with the exhaust port 39, and bring said passage 38 into communication with the suction passage 40, while the other passage 38 will be cut off from the suction passage 40 and brought into communication with the exhaust port 39.

The valve block 24 is also provided with a main supply valve chamber 42 which has reciprocally mounted therein, a main supply valve 43. This valve 43 is, in this instance, a cylindrical member having a return bend duct 44 provided at the central portion thereof, and a pair of right angle ducts 45 arranged one at either side of the duct 44 near a respective end of the valve 43.

A pair of fluid passages 46 and 46' are provided in the valve block 24 with one end thereof communicating with the valve chamber 42 in longitudinal spaced relation thereof.

The hereinbefore mentioned suction passage 40 extends, in this instance, from the auxiliary valve chamber 35 outwardly over the top of the valve chamber 42, and then downwardly to a position substantially midway between the upper and lower wall of the chamber 42, where it branches as at 40′ in opposite directions with one end thereof communicating with the chamber 42 substantially midway between the passages 46 and 46′. The other end of said branch portion is in communication with one end of a vacuum conduit 47 secured in the valve block 24, and which is adapted to have the other end thereof operably connected by any suitable means, as by a flexible tubing not shown, with a suitable source of fluid-operating pressure.

The relation of the ducts 44 and 45 to the ends of the passages 40′, 46 and 46′ communicating with the valve chamber 42, is such that when the valve 43 is at the limit of its movement in one end portion of the chamber 42, the return bend duct 44 will bring the passage 46 or 46′ positioned at that end of the chamber 42 into communication with the suction passage 40′, while the other passage 46 or 46′ will be brought into communication through the right angle duct 45 positioned in the inner end of the valve 43 in communication with an exhaust port 48 provided in the lower wall of the chamber 42.

There are two of these exhaust ports 48 which communicate with the bottom of the chamber 42 in the plane of a respective passage 46 or 46′.

The passage 46′, in this instance, extends outwardly from the chamber 42 with the outer end thereof in communication with one end of a conduit 49 which is secured to the valve block 24.

The conduit 49 extends, in this instance, upwardly from the block 24, and has the upper end thereof secured to the upper positioned diaphragm supporting section 2 in communication with the corresponding recess 5 adjacent the bottom wall 3, as clearly illustrated in Figure 4.

The passage 46, in this instance, extends outwardly a short distance from the chamber 42, and then upwardly through the valve block 24 and through the bottom wall 3 of the lowered positioned diaphragm supporting section 2 with the upper end thereof in communication with the recess 5 in said lowered positioned section (see Figure 9).

The hereinbefore mentioned passages 38 are constructed in the valve block 24 in the manner illustrated in Figure 7, and maintain a respective end of the valve chamber 42 in communication with the auxiliary valve chamber 35.

It will now be observed that the wiper blade 32 will be oscillated through a predetermined wiping zone across the face of the glass G during the vibrations of the diaphragms 10, as said diaphragms are alternately placed at one side thereof under the influence of the fluid-operating pressure through the medium of the rock shaft 16, crank arm 17, rack 18, pinion 19 and wiper shaft 20.

It will now also be clearly understood that the means for automatically placing the diaphragms 10 at one side thereof in communication with the fluid operating pressure is effected through the medium of the main supply valve 43 which, in turn, is reciprocated in the valve chamber 42 by the action of the fluid-operating pressure for operating the diaphragm 10 as determind by the auxiliary valve 36. In other words, as the ends of the main supply valve 43 are alternately brought under the influence of vacuum and atmospheric pressures, the valve will be reciprocated thereby through the chamber 42 from a position near one end thereof to a similar position adjacent the other end thereof, so that the passages 46 and 46′, and therefore, the pressure chambers 5, associated with said passages will be alternately brought into communication with the suction passage 40′ and conduit 47 through the medium of the return bend duct 44, and with the exhaust ports 48 through the medium of the right angle ducts 45.

This longitudinal reciprocative movement of the main supply valve 43 in the chamber 42 is limited by means of a pin 52 secured in the lowered portion of the valve 43, and which extends downwardly through an elongated slot 53 provided in the lower wall of the chamber 42 into a cam recess 54 provided in a cam slide 55.

The cam slide 55, in this instance, is a flat plate member mounted for longitudinal reciprocative movement in a horizontally disposed channel 56 provided in the upper surface of a supporting member 57 which is secured to the lower end of the valve block 24 by screws 58. The supporting member 57, in this instance, is in the plane of the exhaust ports 48 and is provided with a pair of passages 48′ extending therethrough and adapted to register with the exhaust ports 48 when the plate is secured to the valve block.

The length of the slot 53 is greater than the axial movement of the valve 43 to permit the free movement of said valve while the width of the slot is substantially equal to the diameter of the pin 52 for coacting with said pin to prevent rotation of the valve 43 in the chamber 42.

The cam recess 54, in this instance, is formed with a triangular portion 54′ positioned at the inner end of the recess and which has the base portion thereof extending transversely of the plate 55 in parallel relation with the direction of movement of the supply valve 43 and pin 52.

The length of the base of the portion 54′ of the cam recess is such that when the pin 52 is at either end thereof, the valve 43 will be maintained thereby in such a position in the valve chamber 42 that the return bend duct 44 will be in full registration with the suction passage 40′, and one or the other of the passages 46 or 46′, while the other passage 46 or 46′ will be in full registration with the angle duct 45 positioned in the inner end of the valve 43.

The side walls of the recess portion 54′ are, in this instance, irregular in outline forming a plurality of pairs of transversely alined sockets 60 arranged in substantially uniform spaced relation longitudinally of the sides of said recess for receiving therein the pin 52 as the slide 55 is moved inwardly the distance between the sockets 60. The sockets 60 comprising each cooperating alined pair positioned adjacent the apex end of the recess 54′ are such that when they are brought into the path of movement of the pin 52 as shown in Figure 15, the valve 43 will be limited in the reciprocative movement thereof to such an extent that the return bend duct 44 will only partially register with the passages 46 and 46′ and the suction passage 40′ so that the communication of the ducts in the valve 43 with the passages in the valve block 24 will be more or less restricted as shown in Figure 16 with the result that a smaller stream of fluid will pass from the suction passage 40′ to one or the other of the passages 46 or 46′, and the speed of operation of the motor diaphragms will be accordingly retarded.

In other words, by moving the slide 55 longitudinally of the recess 56, the speed of operation of the windshield wiper blade may be readily controlled depending upon which set of sockets 60 are in registration with the path of movement of the pin 52.

The outer portion of the recess 54 is of narrow channel formation and extends from the apex end of the base portion 54' longitudinally and transversely of the slide 55 to a position 54'' in longitudinal alinement with the socket 60 positioned at the corresponding end of the base of the recess portion 54', and then transversely and longitudinally of the plate to a position 54''' in longitudinal alinement with the recess 60 at the opposite end of the base portion 54'.

The cam slide 55 is provided with a reduced outwardly extending handle portion 55' as shown in Figures 1 and 7. This handle portion extends beyond one side of the valve block 24 for providing a convenient means by which the slide may be manually reciprocated in the channel 56.

When it is desired to stop the operation of the windshield cleaner motor, this may be readily accomplished by manually moving the slide 55 inwardly until one or the other of the portions 54'' or 54''' are brought into the path of movement of the pin 52. When the cam slide 55 is so positioned that one or the other of the recess portions 54'' or 54''' is engaged by the pin 52, the valve 43 will be maintained thereby at the corresponding end of the valve chamber 42 against the action of the suction produced at the opposite end of the valve chamber.

When the main supply valve 43 is thus maintained at one end of the valve chamber, one of the pressure chambers 5, depending upon which passage 46 or 46' is maintained in communication with the suction passage 40, will be continuously maintained in communication with said vacuum passage through the medium of the return bend duct 44 so that the diaphragm of said chamber will be maintained in its innermost position with the result that the cleaner element or blade 32 will be maintained at one side of the wiping zone out of the line of vision.

It will also be readily understood that when the cam slide 55 is in the outermost position with the socket 60 adjacent the base of the recess portion 54', in the path of movement of the pin 52, said pin will travel through the widest portion of the recess and the valve 43 may reciprocate in the chamber 42 through its maximum stroke, and will thus bring the ducts 44 and 45 into and out of full registration with the passages 46 and 46', the suction passage 40' and the exhaust ports 48, and thereby obtain the full efficient operation of the motor; that is, the motor and the wiper blade will operate at maximum speed.

If the blade or slide 55 is moved inwardly until the sockets 60 positioned at the inner or apex end of the recess portion 54' are in the path of movement of the pin 52 as shown in Figure 15, the reciprocation of the valve 43 will be limited to its minimum stroke with the ducts in the valve in only partial, say one-third, registration with the passages 40', 46, 46' and ports 48 as shown in Figure 16 so that the motor will operate at greatly reduced or minimum speed. On the other hand, if the slide 55 is moved to a position where the intermediate sockets 60 are in the path of movement of the pin 52, the pressure chambers 5 will be connected with the source of vacuum and atmosphere through only slightly restricted passages where the valve ducts register with the passages in the valve block 24 so that an intermediate speed of operation of the motor and wiper blade will be obtained.

*Operation*

It will now be observed that when the diaphragms 10, auxiliary valve 36, main supply valve 43 and control slide 55 are in the positions illustrated in the drawings, the lower pressure chamber 5 will be in communication with the suction passage 40' and, therefore, be connected with the source of operating pressure, while the upper positioned pressure chamber 5 will be in communication with the exhaust port 48.

The right hand end of the valve 43, as viewed in Figure 7, will be maintained in communication by the auxiliary valve 36 with the suction passage 40', while the left hand end of the valve 43 will be connected with atmospheric pressure through the exhaust port 39, and the valve 43 will be free to move through the maximum stroke thereof in the chamber 42 due to the pin 52 being in registration with the base of the triangular portion 54' of the recess 54.

When the suction passage 40' is in communication with a suitable source of suction, it is obvious that a partial vacuum will be produced in the right hand end of chamber 42 which will effect the longitudinal movement of the valve 43 to its extreme position in the right hand end of the chamber. The chamber 5 provided in the upper positioned diaphragm supporting section 2 will thus be connected with the source of vacuum with the result that the corresponding diaphragm 10 will move in the direction of partial vacuum into the upper positioned chamber 5, while the lower positioned diaphragm 10 will be free to move upwardly with the upper positioned diaphragm due to the fact said lower diaphragm is maintained with equal or atmospheric pressures at opposite sides thereof.

As the diaphragms are thus moved upwardly, the wiper shaft 20 will be rocked through the medium of the rack 18 and pinion 19 and the crank shaft 16 as said shaft 16 is rocked by the diaphragms. This rocking action of the wiper shaft 20 will oscillate the wiper element 32 through the wiping zone from one side thereof to the other.

As the wiper element 32 and shaft 20 approach the end of their movement, the auxiliary valve 36 will be engaged by the tongue 20' of the wiper shaft and rotated thereby in the valve chamber 35 sufficiently to reverse the connections of the ends of the main valve chamber 42 with the suction passage 40' and exhaust port 39 to effect the longitudinal movement of the main control valve to the other extreme position at the opposite end of the valve chamber.

As the main control valve 43 approaches the limit of its movement at the other end of the valve chamber, the upper positioned pressure chamber 5 will be cut off from the suction passage 40' and will be brought into communication with the atmospheric pressure through the medium of the passage 46', right angle duct 45, located at the inner end of the valve 43, and corresponding exhaust port 48. At the same time, the lower positioned chamber 5 will be cut off from atmospheric pressure, and will be brought into communication with the source of suction through the medium of the passage 46, return bend duct 44 and passage 40'.

As the lower positioned chamber 5 is thus brought into communication with the source of suction, the diaphragms 10 will again be moved downwardly producing a corresponding rocking movement of the rock shaft 17, and the wiper shaft 20, and the wiper arm assembly associated therewith. As the wiper arm assembly and wiper shaft 20 approach the limit of their movement, the auxiliary valve 36 will again be rocked to the position illustrated in Figure 10, thereby changing the order of differential pressure on the main control valve 43 so that said valve will again move to the opposite end of the chamber 42.

As the valve 43 approaches the limit of its movement, the lower chamber will again be cut off from communication with the source of suction and will be brought into communication with the atmosphere while the upper positioned chamber 5 will be cut off from the atmosphere and will be brought into communication with the source of suction, producing a corresponding movement of the diaphragms and the wiper element in the manner hereinbefore described.

These cycles of movement of the diaphragms, main supply valves, auxiliary valve and the wiper shaft 20, together with the wiper arm assembly, may continue as long as the suction conduit 47 and the passage 40′ are in communication with the source of vacuum.

When it is desired to discontinue the operation of the windshield wiper, it is only necessary to move the control member 55 inwardly until the recess portion 54″ or the portion 54‴ of the cam recess is brought into registration with the path of movement of the pin 52 whereupon the main control valve 43 will be maintained at the corresponding end of the valve chamber 42 and the diaphragms and the mechanism operated thereby will be maintained inactive in the manner hereinbefore described.

Although I have shown and particularly described the preferred embodiment of my invention, I do not wish to be limited to the exact construction shown, as various changes in the form and relation of the parts thereof may readily be made without departing from the spirit of the invention as set forth in the appended claims.

I claim:

1. A motor adapted to be operated by differential fluid pressure for windshield cleaners or the like, comprising a main supporting means, a wiper operating member journaled in said supporting means, a diaphragm support mounted on said supporting means and including a pair of complemental case sections, each section having a recess in one side thereof, a pair of flexible diaphragms secured one to each case section over said recess, spacing means securing said case sections to each other with the diaphragms arranged adjacent each other in slightly spaced relation, a rock member journaled in the spacing means, discs secured to the outer adjacent surfaces of said diaphragms at the central portion thereof adapted to move during the collapsing of the diaphragms into said recesses, means engaging the discs with the rock member at one side of the axis of rotation of said rock member, means operatively connecting the rock member with the operating member to produce alternating rotary motion of said operating member, and fluid conveying means associated with the support and including an automatic valve mechanism for alternately connecting said recesses with a source of fluid operating pressure and with an exhaust for said operating pressure.

2. In a windshield cleaner, a fluid pressure operated motor for operating a wiper comprising a pair of flexible diaphragms, supporting means for the diaphragms including a pair of complemental case sections, means securing the case sections and diaphragms together with said diaphragms arranged adjacent each other intermediate said case sections to form a pair of spaced fluid pressure chambers, a rock element journaled in the supporting means to extend from intermediate the diaphragms to one side of said diaphragms, means operatively connecting the intermediate portions of the diaphragms to the rock element at one side of the axis of rotation of said element, means for operatively connecting the rock element with the wiper, and fluid conveying means associated with the supporting means and including an automatic valve mechanism for alternately connecting said pressure chambers with a source of fluid operating pressure and with an exhaust for said operating pressure.

3. In a windshield cleaner, a fluid pressure operated motor for operating a wiper comprising a pair of flexible diaphragms, supporting means for the diaphragms including a pair of complemental case sections, means securing the case sections and diaphragms together with said diaphragms arranged adjacent each other intermediate said case sections to form a pair of spaced fluid pressure chambers, a crank shaft journaled in the supporting means, means connected with the intermediate portions of the diaphragms and engaging the crank shaft for operatively connecting said diaphragms with the shaft, means operatively connecting the crank shaft with the wiper, and fluid conveying means associated with the supporting means and including an automatic valve mechanism controlled by the movement of the crank shaft for alternately connecting said pressure chambers with a source of fluid operating pressure and with an exhaust for said operating pressure.

4. In a windshield cleaner, a fluid pressure operated motor for operating a wiper comprising a pair of flexible diaphragms, supporting means for the diaphragms including a pair of complemental case sections, means securing the case sections and diaphragms together with said diaphragms arranged adjacent each other intermediate said case sections to form a pair of spaced fluid pressure chambers, a crank shaft journaled in the supporting means, means connected with the intermediate portions of the diaphragms and engaging the crank shaft for operatively connecting said crank shaft with the diaphragms, a rack slidably supported by the supporting means and connected with the crank shaft, means including a gear member for operatively connecting the rack with the wiper, and fluid conveying means associated with the supporting means including a valve casing and an automatic valve mechanism in said casing for alternately connecting the pressure chambers with a source of fluid operating pressure and with an exhaust for said operating pressure.

5. A motor adapted to be operated by differential fluid pressure for windshield cleaners or the like, comprising supporting means, a wiper shaft journaled in said supporting means, case sections mounted on the supporting means, movable members associated with the case sections to be actuated by differential fluid pressure, means operatively connecting the movable members with the wiper shaft, a valve casing having a suction conduit associated with the support, fluid conveying means comprising a main supply valve in the valve casing actuated by differential fluid pressure controlling the flow of fluid through said conduit for alternately bringing the movable members at one side thereof into communication with said conduit and with the atmosphere, and manually operated means including a cam plate slidably connected with the valve casing and mechanical means for operatively connecting said plate with the main supply valve for controlling the movement of said main supply valve whereby different speeds of operation of the motor are obtained.

6. A motor adapted to be operated by differential fluid pressure for windshield cleaners or the like, comprising supporting means, a wiper shaft journaled in said supporting means, case sections mounted on the supporting means, movable members associated with the case sections to be actuated by differential fluid pressure, means operatively connecting the movable members with the wiper shaft, a valve casing having a suction conduit associated with the support, means comprising a main supply valve in the valve casing actuated by differential fluid pressure controlling the flow of fluid through said conduit for alternately bringing the movable members at one side thereof into communication with said conduit and with the atmosphere, an auxiliary valve means automatically controlling the operation of the main supply valve, and control means including a stop member connected with one of the valves and a manually operated member connected with the valve casing and having a pair of spaced cam surfaces arranged in angular relation with each other for cooperating with said stop member whereby different speeds of operation of the motor are obtained.

7. A motor having operating means actuated by fluid pressure comprising a fluid conveying means associated with the operating means including spaced fluid passages, a valve member movable back and forth to bring certain of the fluid passages into and out of communication with other of said fluid passages to effect the operation of the operating means, means including a member operated by the operating means for actuating said valve member, and control means having a cam action on the valve member for controlling the movement thereof to thus vary the degree of communication between said fluid passages whereby the speed of operation of the operating means may be varied.

8. A motor having operating means actuated by fluid pressure comprising fluid conveying means associated with the operating means including spaced fluid passages, a valve member movable back and forth to bring certain of the fluid passages into and out of communication with other of said fluid passages to effect the operation of the operating means, means for actuating said valve member, a manually operated cam element, and co-acting means operatively connecting said cam element with the valve member whereby the movement of said valve member may be controlled to vary the degree of communication between said fluid passages whereby the speed of operation of the operating means may be varied.

9. A motor having operating means actuated by fluid pressure comprising fluid conveying means associated with the operating means including spaced fluid passages, a valve member movable back and forth to bring certain of the fluid passages into and out of communication with other of said fluid passages to effect the operation of the operating means, means for actuating said valve member, a manually operated control element, and co-acting means including a pin and cam recess associated with the valve member and control element whereby the movement of said valve member may be controlled to vary the degree of communication between said fluid passages whereby the speed of operation of the operating means may be varied.

10. A motor having operating means actuated by fluid pressure comprising fluid conveying means associated with the operating means including spaced fluid passages, a valve member movable back and forth to bring certain of the fluid passages into and out of communication with other of said fluid passages to effect the operation of the operating means, means for actuating said valve member by differential pressure, and manually operated control means including a member having graduated fixed restricting portions for limiting the movement of the valve member to vary the degree of communication between said fluid passages whereby the speed of operation of the operating means may be varied, said control means being provided with an additional restricting portion adapted to hold the valve member against the action of the differential pressure for maintaining the operating means in a predetermined position.

11. A motor having operating means actuated by fluid pressure comprising fluid conveying means associated with the operating means including spaced fluid passages, a valve member movable back and forth to bring certain of the fluid passages into and out of communication with other of said fluid passages to effect the operation of the operating means, means for actuating said valve member by differential pressure, and manually operated control means including a member having graduated restricting portions for limiting the movement of the valve member to vary the degree of communication between said fluid passages whereby the speed of operation of the operating means may be varied, and additional restricting portions arranged in spaced relation relative to the axis of movement of the valve member adapted to selectively hold said valve member in one of two positions against the action of the differential pressure for maintaining the operating means in a predetermined position.

12. A fluid pressure operated motor for a windshield cleaner or the like, comprising a pair of flexible diaphragms, supporting means for the diaphragms including a pair of complemental case sections, means securing the case sections and diaphragms together with said diaphragms arranged adjacent each other intermediate said case sections to form a pair of spaced fluid pressure chambers, a crank shaft journaled in the supporting means to extend from intermediate the diaphragms to one side of said diaphragms, and connecting means secured to the intermediate portions of the diaphragms including elements adapted to releasably engage diametrically opposite side portions of the crank shaft whereby said shaft may be operatively connected with the diaphragms by the insertion of the shaft between said elements.

13. A device constructed in accordance with claim 12 provided with an automatic valve mechanism controlled by the movement of the crank shaft for varying the fluid pressures existing in the pressure chambers.

14. In a fluid pressure operated motor for a windshield cleaner wiper element or the like, in combination, a supporting means including a diaphragm support and a valve support arranged at one side of the diaphragm support, a pair of flexible diaphragms secured to the diaphragm support to provide separate fluid tight pressure chambers, one chamber being arranged at one side of the diaphragms, the opposite side of each of the diaphragms being permanently exposed to atmospheric pressure, a drive shaft connected with the supporting means to rotate about an axis extending substantially normal to the direction of movement to the diaphragms, a gear member mounted on the shaft, a rack member meshing with the gear and slidably supported by the supporting means to reciprocate in a direction substantially normal to the direction of movement of the diaphragms, means mounted exteriorly of the pressure chambers, operatively connecting the diaphragms and rack member to each other, and fluid conveying means including an automatic valve mechanism supported by the valve support exteriorly of the pressure chambers for alternately connecting the pressure chambers with a source of fluid operating pressure and with an exhaust for said operating pressure.

ARTHUR B. WINCHELL.